J. Harr.

Horse Power.

N° 3,953.  Patented Mar. 15, 1845.

UNITED STATES PATENT OFFICE.

JNO. HAW, OF HANOVER, VIRGINIA.

HORSE-POWER.

Specification of Letters Patent No. 3,953, dated March 15, 1845.

*To all whom it may concern:*

Be it known that I, JOHN HAW, of Hanover, in the county of Hanover and State of Virginia, have invented a new and useful Improvement in Horse-Powers, which is described as follows, reference being had to the annexed drawings of the same making part of this specification.

Figure 1:
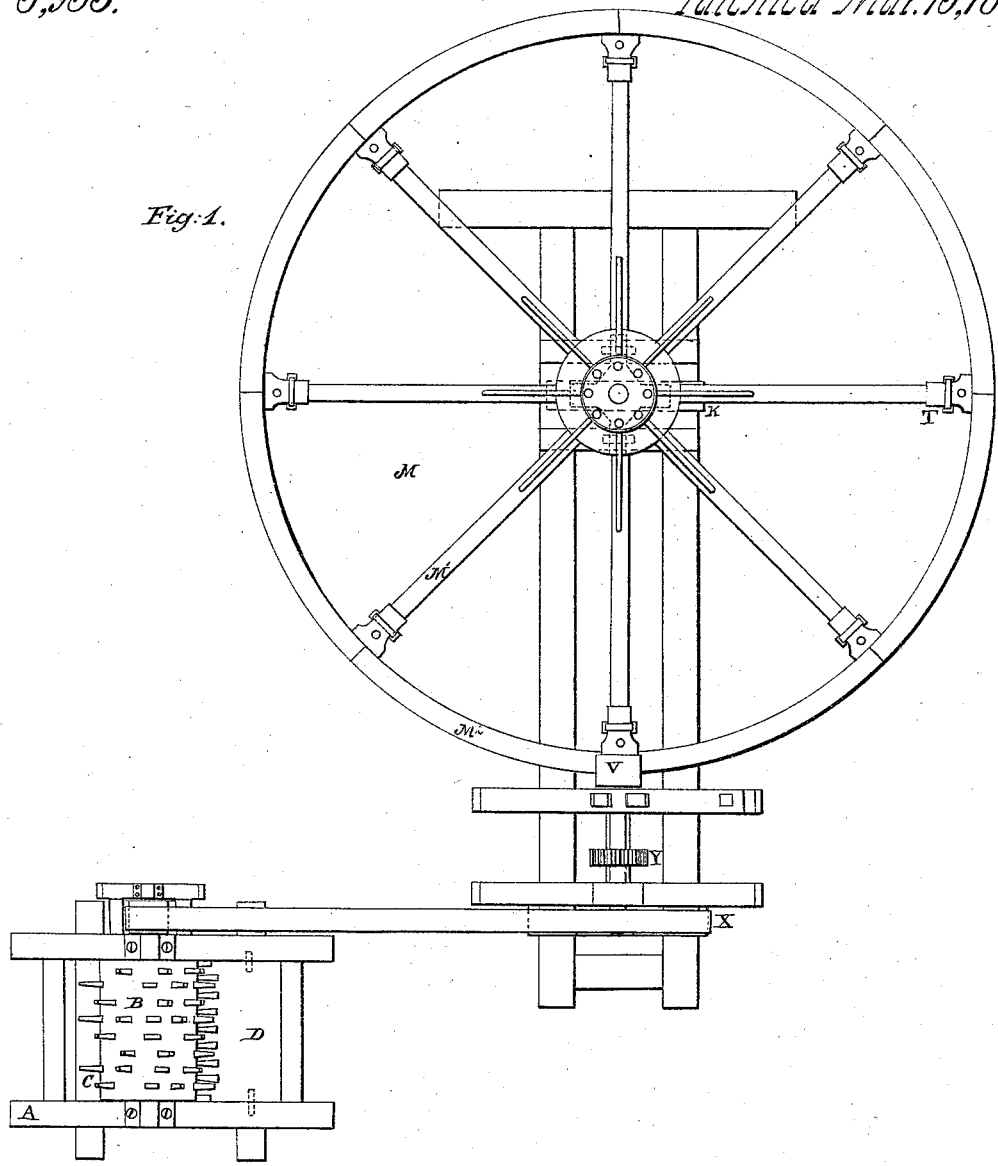
Figure 2:
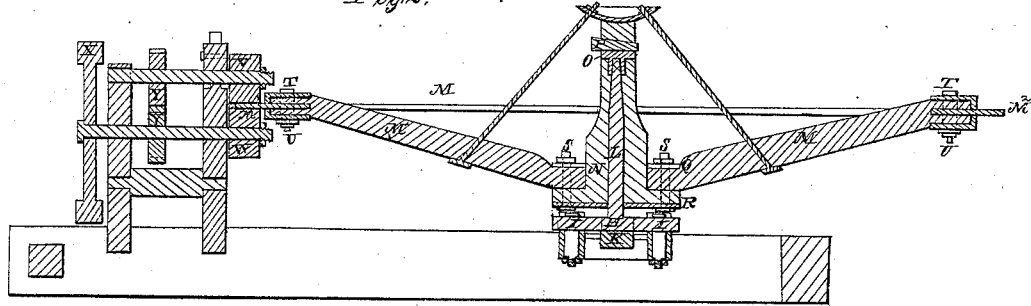

Figure 1 is a plan of the machine. Fig. 2 is an elevation of ditto.

A metallic bed H having two trunnions I I turning in suitable boxes is arranged in a suitable frame. This bed is made to turn on its trunnions when required in the manner hereafter specified. At other times and during the operation of the machine it is held firmly in a horizontal position by means of a key block K inserted below it. From the center of this bed there rises vertically a spindle L of the requisite length and diameter having its upper end rounded or made conical. To the head of this spindle I hang the main or driving wheel M which is made disk shaped, except its outer rim M² which is horizontal and circular. The hub N of this wheel is perforated from its lower end upward about two thirds its length into which the spindle is inserted. The upper end of the spindle enters a metallic ink or box O inserted into an oblong mortise in the hub intersecting the aforesaid vertical aperture having a wedge shaped key P inserted above it through the hub for depressing the ink as the shaft wears in order to lift the wheel to its required position. The arms M′ may be mortised and tenanted into the hub radiating therefrom upward at an angle of about 10 or 15 degrees with a horizontal plane, or the larger ends of the arms may be confined between circular metallic plates Q, R, the lower of which being confined to the lower end of the hub by screw bolts and the upper one brought down upon the arms by screw bolts S passing through it and the lower plate.

The circular rim M² secured to the outer extremities of the arms is made in segments with flanges by which they are fastened together and to the ends of the arms by clamps or cuffs T and screws V. The segments however, may be fastened together and to the ends of the arms in any convenient way. The aforesaid circular rim is brought between two rollers V W on revolving axles, turning in boxes or on anti friction rollers in a suitable frame—one of said rollers being placed below the rim of the driving wheel and the other above it the latter being weighted and pressed hard down upon the rim producing sufficient adhesion between said rim and said rollers to give the necessary propelling power to the axle of the lower roller upon which is placed the band wheel X which leads to the pulley on the axle of the threshing cylinder or other place where the power is to be conveyed. On each of the axles of the rollers is placed a cog wheel Y the one meshing into the other. The friction is augmented by means of levers and weights. When it is required to stop the machine it is only necessary to raise said levers—which removes the friction and stops the machine.

The animals that propel the machine are attached to the arms M′ on the inner side of the rim M² and when they are being attached the before described block K beneath the bed is withdrawn which allows the bed to turn on its trunnions I and incline the spindle L which brings the side of the wheel to which the animal is to be attached down upon the ground so that the animal can step over the rim between the arms where it is to be geared. The wheel is then canted to the opposite side to attach another horse. The spindle is then brought to a vertical position, secured by the blocks and the horses started which propels the driving wheel, rollers, band wheel, and whatever machine is intended to be propelled thereby.

What I claim as my invention and desire to secure by Letters Patent is—

1. Hanging the spindle on which the horse wheel turns to journals or trunnions to admit of canting the wheel for admitting the horses, &c., within the rim, as herein described or in any other substantially similar manner.

2. I also claim applying the circular metallic rim as a propelling power in combination with two rollers placed on axles which are connected by two cogged wheels geared into each other thus combining the adhesion which is acquired on both sides of the rim as described.

JOHN HAW.

Signed in the presence of—
GEORGE WATT,
GEORGE W. ELLIOTT.